(12) United States Patent
Maheshwari et al.

(10) Patent No.: US 12,273,107 B2
(45) Date of Patent: Apr. 8, 2025

(54) DYNAMICALLY SCALABLE TIMING AND POWER MODELS FOR PROGRAMMABLE LOGIC DEVICES

(71) Applicant: Intel Corporation, Santa Clara, CA (US)

(72) Inventors: Atul Maheshwari, Portland, OR (US); Mahesh Iyer, Fremont, CA (US); Mahesh K. Kumashikar, Bangalore (IN); Ian Kuon, Toronto (CA); Yuet Li, Fremont, CA (US); Ankireddy Nalamalpu, Portland, OR (US); Dheeraj Subbareddy, Portland, OR (US)

(73) Assignee: Altera Corporation, San Jose, CA (US)

(*) Notice: Subject to any disclaimer, the term of this patent is extended or adjusted under 35 U.S.C. 154(b) by 638 days.

(21) Appl. No.: 17/559,831

(22) Filed: Dec. 22, 2021

(65) Prior Publication Data

US 2022/0116042 A1 Apr. 14, 2022

(51) Int. Cl.
*H03K 19/177* (2020.01)
*G06F 30/34* (2020.01)

(52) U.S. Cl.
CPC ........... *H03K 19/177* (2013.01); *G06F 30/34* (2020.01)

(58) Field of Classification Search
CPC ............ H03K 19/177; H03K 19/17784; G06F 30/34; G06F 2119/06; G06F 2119/12
See application file for complete search history.

(56) References Cited

U.S. PATENT DOCUMENTS

| | | | |
|---|---|---|---|
| 7,581,124 B1* | 8/2009 | Jacobson | G11C 29/028 713/300 |
| 8,141,018 B1* | 3/2012 | Guzy | G06F 30/34 716/113 |
| 8,661,386 B1* | 2/2014 | Parpia | G06F 30/367 716/108 |
| 10,523,203 B2* | 12/2019 | Hoede | H03K 19/0016 |
| 2006/0095869 A1* | 5/2006 | Levy | G06F 30/367 716/113 |

(Continued)

OTHER PUBLICATIONS

J. L. Nunez-Yanez, "Adaptive Voltage Scaling with In-Situ Detectors in Commercial FPGAs," in IEEE Transactions on Computers, vol. 64, No. 1, pp. 45-53, Jan. 1, 2015 (Year: 2015).*

*Primary Examiner* — Stacy Whitmore
(74) *Attorney, Agent, or Firm* — Fletcher Yoder, P.C.

(57) ABSTRACT

Embodiments of the present disclosure are related to dynamically adjusting a timing and/or power model for a programmable logic device. In particular, the present disclosure is directed to adjusting a timing and/or power model of the programmable logic device that operates at a voltage level that is not other than a predefined voltage defined by a voltage library. A system of the present disclosure may interpolate between voltage levels defined by the voltage libraries to generate a new voltage library for the programmable logic device. A timing and/or power model may be generated for the programmable logic device based on the new voltage library and the programmable logic device may be analyzed using the timing and/or power model at the interpolated voltage. The timing and/or power model may be used to generate a bitstream that is used to program the integrated circuit.

20 Claims, 4 Drawing Sheets

(56) References Cited

U.S. PATENT DOCUMENTS

2015/0204914 A1* 7/2015 Fujii .................... G01R 35/005
                                                      324/207.17
2017/0272073 A1* 9/2017 Betz ................... H03K 19/1774
2018/0175858 A1* 6/2018 Hoede .............. H03K 19/17784
2018/0373829 A1* 12/2018 Mendel ............... G06F 30/3312
2019/0115924 A1* 4/2019 Betz ................. H03K 19/17784

* cited by examiner

DYNAMICALLY SCALABLE TIMING AND POWER MODELS FOR PROGRAMMABLE LOGIC DEVICES

BACKGROUND

The present disclosure relates generally to integrated circuit (IC) devices, such as programmable logic devices (PLDs). More particularly, the present disclosure is related to dynamically adjusting a timing and/or power model for a PLD.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Integrated circuit devices may be utilized for a variety of purposes or applications, such as digital signal processing and machine learning. Indeed, machine learning and artificial intelligence applications have become ever more prevalent. Programmable logic devices (PLDs) may perform many of these functions. It may be desired for a programmable logic device (PLD) to operate using a particular power level. Some integrated circuit devices may have various voltage libraries for predefined voltage levels that can be used. The voltage libraries may be used for controlling the integrated circuit devices which operate at the corresponding voltage level. However, a particular integrated circuit device may operate at a particular voltage level that is not one of the predefined voltage levels.

A system design of some integrated circuit devices may be fixed during manufacturing and, thus, may have an operating voltage level that is predictable in advance of operation. However, a system design of a programmable logic device, such as a field programmable gate array (FPGA), may not be known at the time of manufacturing. Therefore, behavior of the PLD in operation is not known at the time of manufacturing. Further, if the PLD operates at a voltage level other than the particular voltage level of the PLD may cause operating inefficiency and consumption of additional (e.g., wasted) power.

BRIEF DESCRIPTION OF THE DRAWINGS

Various aspects of this disclosure may be better understood upon reading the following detailed description and upon reference to the drawings described below.

DETAILED DESCRIPTION OF SPECIFIC EMBODIMENTS

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "including" and "having" are intended to be inclusive and mean that there may be additional elements other than the listed elements. Additionally, it should be understood that references to "some embodiments," "embodiments," "one embodiment," or "an embodiment" of the present disclosure are not intended to be interpreted as excluding the existence of additional embodiments that also incorporate the recited features. Furthermore, the phrase A "based on" B is intended to mean that A is at least partially based on B. Moreover, the term "or" is intended to be inclusive (e.g., logical OR) and not exclusive (e.g., logical XOR). In other words, the phrase A "or" B is intended to mean A, B, or both A and B.

As processing applications have become ever more prevalent, there is a growing desire for circuitry to perform complex calculations that may use large amounts of power. Processing applications may be implemented in programmable logic of a programmable logic device (PLD), like a field programmable gate array (FPGA). Increasingly, it may be desired for PLDs to become more efficient and consume less power. The present disclosure describes system and techniques related to dynamically adjusting a voltage level for a programmable logic device (PLD), such as a field programmable gate array (FPGA). The present disclosure is also related to generating a scalable timing and/or power model for a PLD and analyzing a system design or optimizing the generation of a bitstream to configure the PLD using the timing and/or power model. For example, the PLD may utilize a voltage level different than one or more voltage levels in predefined voltage libraries. In that case, if a voltage from a predefined library was used for the PLD, the suboptimal voltage level may cause the PLD to operate inefficiently. Further, if the voltage level of the predefined library is higher than needed by the PLD, excess (e.g., wasted) power may be consumed by the PLD.

Figure 1:
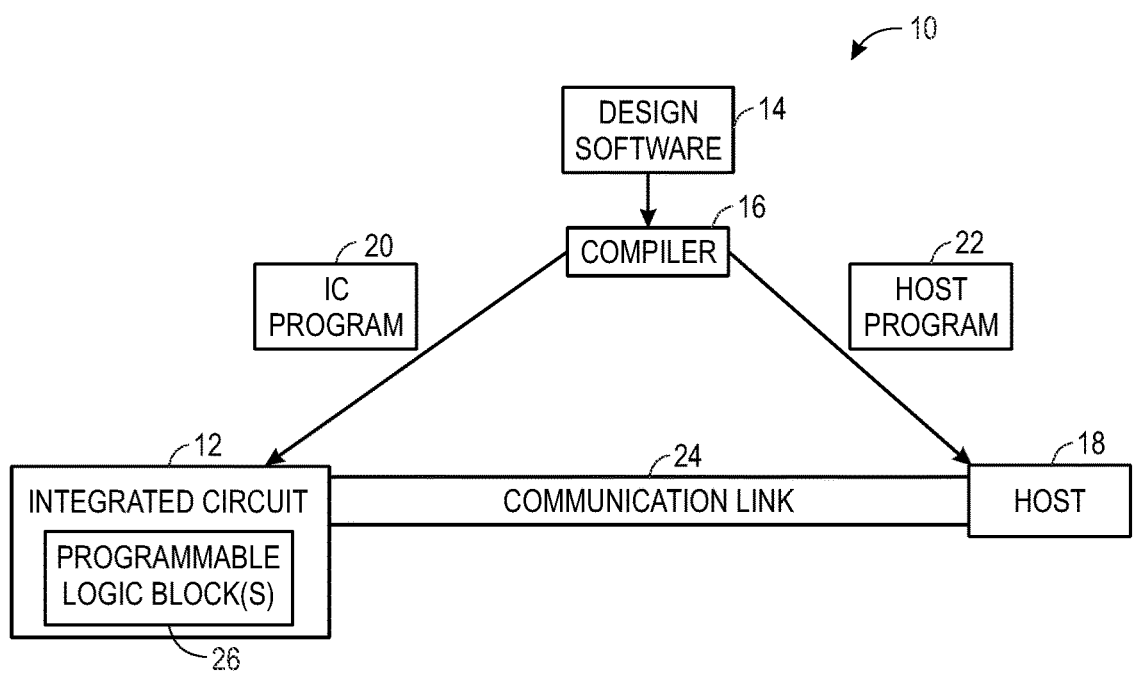
FIG. 1 is a block diagram of a system that may generate a timing and/or power model for an integrated circuit, in accordance with an embodiment of the present disclosure.

With the foregoing in mind, FIG. 1 is a block diagram of a system 10 that may generate a timing and/or power model for an integrated circuit (IC) 12, in accordance with an embodiment of the present disclosure. A designer of the integrated circuit 12 may desire to implement functionality, such as generating a timing and/or power model operations of this disclosure, on the integrated circuit 12 (such as a field-programmable gate array (FPGA) or an application-specific integrated circuit (ASIC)). In some cases, the designer may specify a high-level program to be implemented, such as an OpenCL program, which may enable the designer to more efficiently and easily provide programming instructions to configure a set of programmable logic cells for the integrated circuit 12 without specific knowledge of low-level hardware description languages (e.g., Verilog or VHDL). For example, because OpenCL is quite similar to other high-level programming languages, such as C++, designers of programmable logic familiar with such programming languages may have a reduced learning curve than designers that are required to learn unfamiliar low-level hardware description languages to implement new functionalities in the integrated circuit 12.

The designers may implement their high-level designs using design software 14, such as a version of Intel® Quartus® by INTEL CORPORATION. The design software 14 may use a compiler 16 to convert the high-level program into a lower-level description. The compiler 16 may provide machine-readable instructions representative of the high-level program to a host 18 and the integrated circuit 12. The host 18 may be a computing device (e.g., a host device). The host 18 may receive a host program 22 which may be implemented by integrated circuit (IC) programs 20. In some embodiments, the IC programs 20 may be kernel programs. To implement the host program 22, the host 18 may communicate instructions from the host program 22 to the integrated circuit 12 via a communications link 24, which may be, for example, direct memory access (DMA) communications or peripheral component interconnect express (PCIe) communications. In some embodiments, the integrated circuit programs 20 and the host 18 may enable configuration of programmable logic 26 on the integrated circuit 12. The programmable logic 26 may include circuitry to implement, for example, operations to perform matrix-matrix or matrix-vector multiplication for AI or non-AI data processing. The integrated circuit 12 may include many (e.g., hundreds, thousands, millions of) logic cells that define the programmable logic 26. Additionally, the programmable logic 26 may be communicatively coupled to one another such that data outputted from one portion of the programmable logic 26 may be provided to other portions of the programmable logic 26.

In some embodiments, the designer may use the design software 14 to generate and/or to specify a low-level program, such as the low-level hardware description languages described above. Further, in some embodiments, the system 10 may be implemented without a separate host program 22. Moreover, in some embodiments, the techniques described herein may be implemented in circuitry as a non-programmable circuit design. Thus, embodiments described herein are intended to be illustrative and not limiting.

Further, it should be understood that the integrated circuit 12 may be any other suitable type of integrated circuit device (e.g., an application-specific integrated circuit and/or application-specific standard product). As shown, the integrated circuit 12 may have input/output circuitry for driving signals off device and for receiving signals from other devices via input/output pins. Interconnection resources, such as global and local vertical and horizontal conductive lines and buses, may be used to route signals on integrated circuit 12. Additionally, interconnection resources may include fixed interconnects (conductive lines) and programmable interconnects (e.g., programmable connections between respective fixed interconnects). Programmable logic 26 may include combinational and sequential logic circuitry. For example, programmable logic 26 may include look-up tables, registers, and multiplexers. The programmable logic 26 may include combinational or sequential logic circuitry arranged in logic array blocks (LABs) or configurable logic blocks (CLBs). In various embodiments, the programmable logic 26 may be configured to perform a custom logic function. The programmable interconnects associated with interconnection resources may be considered to be a part of the programmable logic 26.

Programmable logic devices (PLDs), such as integrated circuit 12, may contain programmable elements (e.g., logic cells, logic blocks) within the programmable logic 26. For example, as discussed above, a designer (e.g., a customer) may program (e.g., configure) the programmable logic 26 to perform one or more desired functions. By way of example, some programmable logic devices may be programmed by configuring their programmable elements using mask programming arrangements, which is performed during semiconductor manufacturing. Other programmable logic devices are configured after semiconductor fabrication operations have been completed, such as by using electrical programming or laser programming to program their programmable elements. In general, programmable elements may be based on any suitable programmable technology, such as fuses, antifuses, electrically programmable read-only-memory technology, random-access memory cells, mask-programmed elements, and so forth.

Many PLDs are electrically programmed. With electrical programming arrangements, the programmable elements may be formed from one or more memory cells. For example, during programming, configuration data is loaded into the memory cells using pins, input/output circuitry, and the like. In one embodiment, the memory cells may be implemented as random-access-memory (RAM) cells. The use of memory cells based on RAM technology is described herein is intended to be only one example. Further, because these RAM cells are loaded with configuration data during programming, they are sometimes referred to as configuration RAM cells (CRAM). These memory cells may each provide a corresponding static control output signal that controls the state of an associated logic component in programmable logic 26. CRAM cells may be located within the footprint of the programmable logic 26 or outside the footprint in a dedicated configuration memory. For instance, in some embodiments, the output signals may be applied to the gates of metal-oxide-semiconductor (MOS) transistors within the programmable logic 26.

Figure 2:
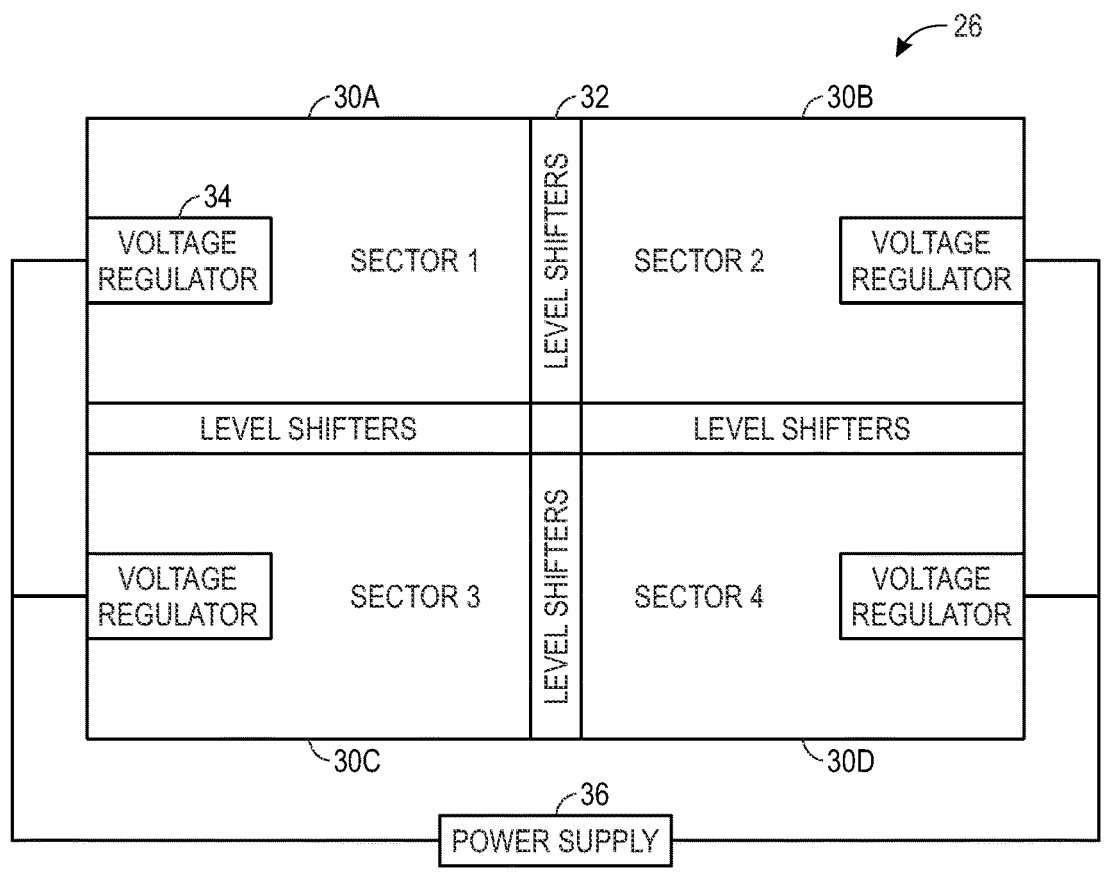
FIG. 2 is a block diagram of an integrated circuit device of the system of FIG. 1, in accordance with an embodiment of the present disclosure.

FIG. 2 is a block diagram of an integrated circuit 12 of the system 10 of FIG. 1, in accordance with an embodiment of the present disclosure. More specifically, FIG. 2 illustrates a block diagram of the programmable logic 26 of the integrated circuit 12 of FIG. 1. The programmable logic 26 is be divided into a first sector 30A, a second sector 30B, a third sector 30C, and a fourth sector 30D. The sectors 30A, 30B, 30C, 30D of the programmable logic 26 may be separated from one another by horizontally arranged level shifters 32 and vertically arranged level shifters 32. The level shifters 32 may provide a voltage level lower than a maximum or default voltage level of the programmable logic 26 to at least one of the sectors 30A, 30B, 30C, 30D during operation. The level shifters 32 may enable each sector 30A, 30B, 30C, 30D to establish an independent power domain within the programmable logic 26. For example, the level shifters 32 may enable the first sector 30A operating at a first voltage to communicate with the second sector 30B that may be operating at a second voltage higher than the first voltage.

Additionally, each sector 30A, 30B, 30C, 30D may be coupled to an independent voltage regulator 34 and a power supply 36. As shown, each sector 30A, 30B, 30C, 30D may be coupled to the same power supply 36. In some embodiments, each sector 30A, 30B, 30C, 30D may be coupled to an independent and separate power supply 36. The power supply 36 may provide power control for each sector 30A, 30B, 30C, 30D. The level shifters 32 may be located on all the fabric wires between each sector 30A, 30B, 30C, 30D, and may separate each of the sectors 30A, 30B, 30C, 30D.

Each sector 30A, 30B, 30C, 30D may include sector control circuitry that may receive control signals from the programmable logic device software 14 (e.g., from the programmable logic device software, from a host, or from an overall device controller such as a secure device manager (SDM)). The programmable logic device software may designate voltage levels of the multiple voltage domains (e.g., libraries) corresponding to each sector 30A, 30B, 30C, 30D of the programmable logic 26. Each sector 30A, 30B, 30C, 30D may receive the designated voltage level, and utilize the voltage regulator 34 corresponding to the sector 30A, 30B, 30C, 30D to regulate the voltage level of the sector 30A, 30B, 30C, 30D.

In some cases, the programmable logic fabric software may assign voltage levels based on logic assigned to run on each of the sectors 30A, 30B, 30C, 30D. For example, the programmable logic fabric software may assign a higher voltage to the first sector 30A and lower voltage to the second sector 30B. The programmable logic fabric software may direct critical logic (e.g., high-priority logic, critical paths) to the first sector 30A that is assigned a higher voltage and assign non-critical logic (e.g., low-priority logic, non-critical paths) to the second sector 30B. In this manner, the programmable logic fabric may utilize power per the sectors 30A, 30B, 30C, 30D as desired, rather than setting the entire programmable logic fabric to a high power and unnecessarily expending the power output of the programmable logic 26.

Figure 3:
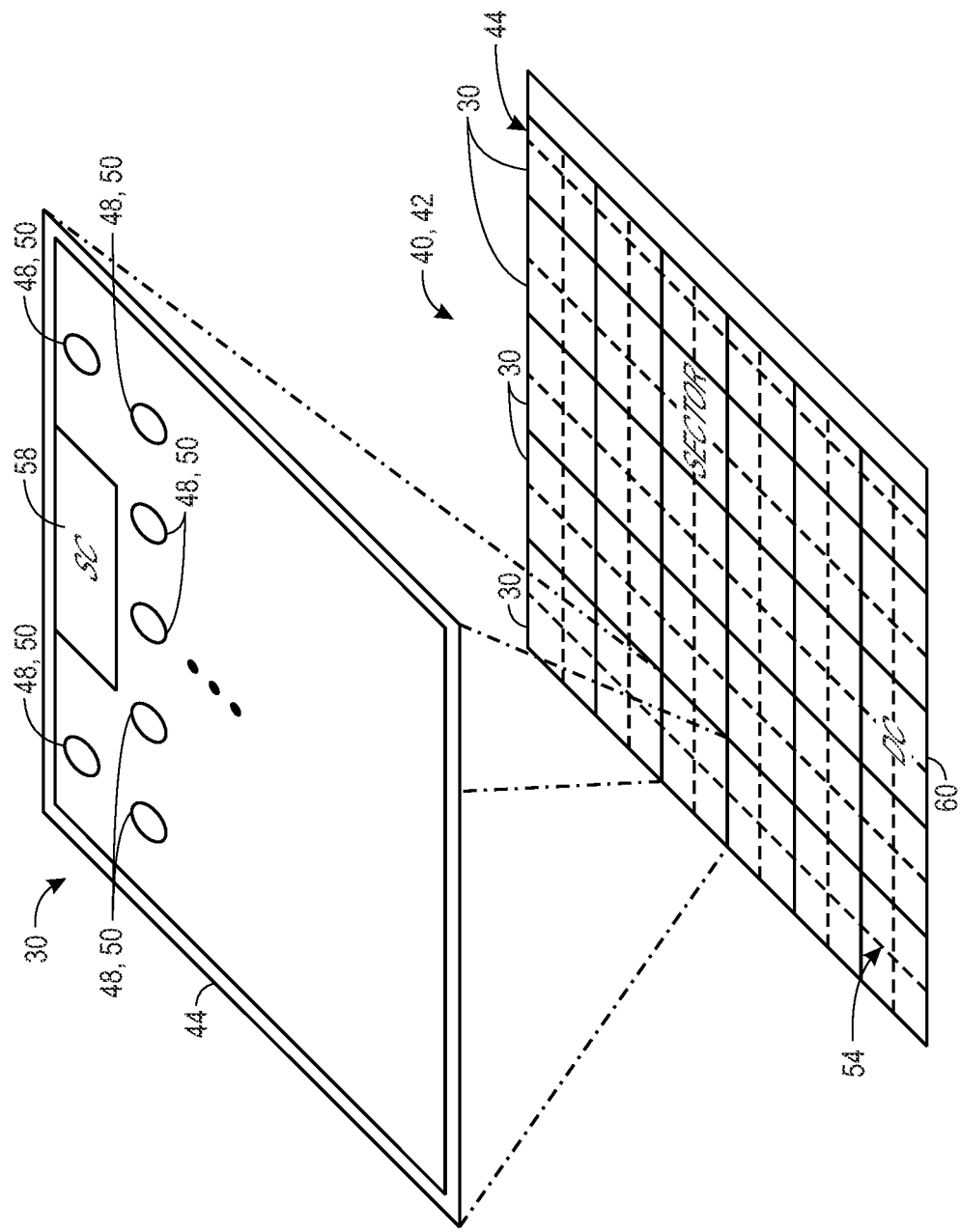
FIG. 3 is a diagram of a programmable fabric of the integrated circuit of FIG. 2, in accordance with an embodiment of the present disclosure.

FIG. 3 is a diagram depicting programmable logic sectors 30 of a field programmable gate array (FPGA) 40, in accordance with an embodiment of the present disclosure. An integrated circuit may utilize one or more programmable logic devices (e.g., programmable fabrics, FPGAs, etc.). In some embodiments, the FPGA 40 may include a transceiver that may include and/or use input-output circuitry for driving signals off the FPGA 40 and for receiving signals from other devices. Interconnection resources 44 may be used to route signals, such as clock or data signals, through the FPGA 40.

The FPGA 40 is sectorized such that that programmable logic resources may be distributed through a number of discrete programmable logic sectors 30. Each programmable logic sector 30 may include a number of programmable logic elements 48 having operations defined by configuration memory 50 (e.g., configuration random access memory (CRAM)).

The programmable logic elements 48 may include (e.g., implement) combinational or sequential logic circuitry. For example, the programmable logic elements 48 may include look-up tables, registers, multiplexers, routing wires, and so forth. A designer may program the programmable logic elements 48 to perform a variety of desired functions. A power supply, such as the power supply 36 discussed with respect to FIG. 2, may provide a source of voltage (e.g., supply voltage) and/or current to a power distribution network (PDN) 54 that distributes electrical power to the various components of the FPGA 40. Operating the circuitry of the FPGA 40 may cause power to be drawn from the power distribution network 54. It should be understood that any suitable number of the power supplies 36 may be implemented or used.

There may be any suitable number of programmable logic sectors 30 on the FPGA 40. Indeed, while twenty-nine programmable logic sectors 30 are shown here, it should be appreciated that more or fewer may appear in an actual implementation (e.g., in some cases, on the order of 50, 100, 500, 1000, 5000, 10,000, 50,000, or 100,000 sectors, or more). Each programmable logic sector 30 may include a sector controller (SC) 58 (e.g., local sector manager (LSM)) that controls the operation of the programmable logic sector 38. Each sector controller 58 may be in communication with a device controller (DC) 60 (e.g., secure device manager (SDM)).

Each sector controller 58 may accept commands and data from the device controller 60 and may read data from and write data into its configuration memory 50 based on control signals from the device controller 60. In addition to these operations, the sector controller 58 may be augmented with numerous additional capabilities. For example, such capabilities may include locally sequencing reads and writes to implement error detection and correction on the configuration memory 50 and sequencing test control signals to effect various test modes.

The sector controllers 58 and the device controller 60 may be implemented as state machines and/or processors. For example, each operation of the sector controllers 218 or the device controller 60 may be implemented as a separate routine in a memory containing a control program. This control program memory may be fixed in a read-only memory (ROM) or stored in a writable memory, such as random-access memory (RAM).

The ROM may have a size larger than would be used to store only one copy of each routine. This may allow each routine to have multiple variants depending on "modes" the local controller may be placed into. When the control program memory is implemented as random access memory (RAM), the RAM may be written with new routines to implement new operations and functionality into the programmable logic sectors 30. This may provide usable extensibility in an efficient and easily understood way. This may be useful because new commands could bring about large amounts of local activity within the sector at the expense of only a small amount of communication between the device controller 60 and the sector controllers 58.

Each sector controller 58 thus may communicate with the device controller 60, which may coordinate the operations of the sector controllers 58 and convey commands initiated from outside the FPGA 40. To support this communication, the interconnection resources 44 may act as a network between the device controller 60 and each sector controller 58. The interconnection resources may support a wide variety of signals between the device controller 60 and each sector controller 58. In one example, these signals may be transmitted as communication packets.

The FPGA 40 may be electrically programmed. With electrical programming arrangements, the programmable logic elements 48 may include one or more logic elements (wires, gates, registers, etc.). For example, during programming, configuration data is loaded into the configuration memory 50 using pins and input/output circuitry. In one example, the configuration memory 50 may be implemented as configuration random-access-memory (CRAM) cells. As discussed below, in some embodiments, the configuration data may be loaded into the FPGA 40 using an update to microcode of the processor in which the FPGA 40 is embedded.

The sector controller 58 of the programmable logic sector 30 is shown to read and write to the configuration memory 50 by providing an ADDRESS signal to an address register and providing a memory write signal (WRITE), a memory read signal (RD DATA), and/or the data to be written (WR DATA) to a data register. These signals may be used to cause the data register to write data to or read data from a line of configuration memory 50 that has been activated along an address line, as provided by the ADDRESS signal applied to the address register. Memory read/write circuitry may be used to write data into the activated configuration memory 50 cells when the data register is writing data and may be used to sense and read data from the activated configuration memory 50 cells when the data register is reading data. The sector controller 58 may receive instructions from a program of the programmable logic fabric to control the voltage of the sector. For example, the sector control may receive instructions from the software program of the programmable logic fabric device to raise the voltage within the sector and may send a signal to the device controller 60 and/or sector controller to raise the voltage within the sector 30.

Figure 4:
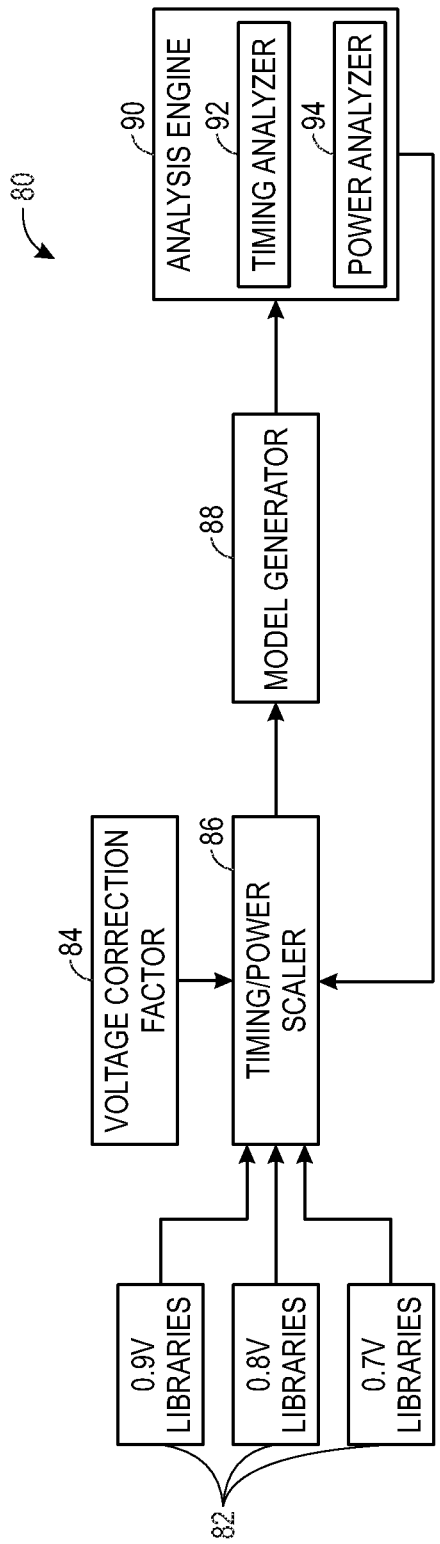
FIG. 4 is a block diagram of a system for generating a timing and/or power model for the integrated circuit of FIGS. 1-3, in accordance with an embodiment of the present disclosure.

FIG. 4 is a block diagram of a system 80 for generating a timing and/or power model for the integrated circuit of FIGS. 1-3, in accordance with an embodiment of the present disclosure. The system 80 may be implemented by programmable logic design software, such as the design software 14 discussed with respect to FIGS. 1-3 above. As shown, the system 80 includes a number of voltage libraries 82. Each of the voltage libraries 82 may be a timing and/or power library that is used for a discrete voltage level and/or discrete power, voltage, and temperature (PVT) conditions that may be associated with a particular integrated circuit. For example, as shown, the voltage libraries 82 are associated with the voltage levels of 09. Volts, 0.8 volts, and 0.7 volts. It should be understood that any number of voltage libraries may be used. It should also be understood that the specific voltage levels of the voltage libraries 82 are merely examples and that any number of voltages and any denomination of a voltage level may be used (e.g., tenths, hundredths, thousandths, etc.). In some embodiments, the voltage libraries 82 may be similar to standard cell technology libraries defining logic functions, timing arcs, and other parameters for corresponding PVT conditions of an integrated circuit.

A timing/power scaler 86 may be coupled to the voltage libraries 82 and a voltage correction factor 84. The timing/power scaler 86 may receive a voltage level for a particular integrated circuit (e.g., a PLD) and determine a voltage level of the nearest voltage library 82. If the voltage level of the integrated circuit matches a voltage level of a particular voltage library, that voltage library may be used by a model generator 88 to generate a timing and/or power model for the integrated circuit. If the voltage level of the integrated circuit does not match a voltage level of one of the voltage libraries 82, the timing/power scaler 86 may interpolate between voltage libraries 82. In some cases, the scaler 86 may interpolate between the two closest voltage libraries 82 (one higher voltage level and one lower voltage level) and/or apply a voltage correction factor 84 to a closest voltage library 82 to generate a timing and/or power model for the integrated circuit. It should be understood that the scaler 86 may interpolate between any number of voltage libraries 82 (e.g., more than two voltage libraries 82) to generate the timing and/or power model. In some embodiments, the designer of the integrated circuit may provide as an input to the scaler 86 a desired frequency, voltage, and/or power of the integrated circuit.

In operation, the system 80 may determine that a voltage level of a particular integrated circuit is between voltage levels of two of the voltage libraries 82. In that case, the system 80 (e.g., the timing/power scaler 86) may interpolate or scale one of the library voltage levels 82 to the voltage level of the integrated circuit. The voltage correction factor 84 may be provided to the system 80 based on the voltage of the integrated circuit. In some cases, the voltage correction factor 84 may be based on silicon PVT factors for a particular integrated circuit. The timing/power scaler 86 may use the voltage correction factor 84 in the interpolation to determine the optimal voltage level for the integrated circuit.

The analysis engine 90 may include a timing analyzer 92 and a power analyzer 94 that are generated by the model generator 88. In some embodiments, the timing analyzer 92 and the power analyzer 94 may be part of a single analyzer. The timing analyzer 92 and the power analyzer 94 may determine an amount of slack for a particular workload of the integrated circuit. The slack may be a timing slack, a power slack, or a combination thereof. The slack may indicate a difference between the actual frequency and/or power of the integrated circuit and a target frequency and/or power of the integrated circuit at a particular voltage (e.g., a particular voltage library 82). If the slack is positive, the integrated circuit may be able to operate at a lower input voltage while maintaining the target frequency, power, and/or timing constraints of the integrated circuit. In that case, the analyzers 90, 92 may indicate to the scaler 86 that a lower voltage may be used for the integrated circuit. Then, the scaler 86 may interpolate between voltage libraries to determine an optimal voltage for the integrated circuit to operate at a high(er) efficiency such that the slack is near zero. Once the interpolation is completed, the analyzers 90, 92 may again determine the slack of the integrated circuit at the interpolated voltage level. In some embodiments, the slack may be determined by the scaler 86 and/or provided to the scaler 86 by the designer of the integrated circuit. In some embodiments, the analysis engine 90 may provide the slack to the scaler 86 to determine an updated interpolated voltage level for the integrated circuit, as discussed herein.

In operation, the timing/power scaler 86 may use any suitable interpolation technique such as linear interpolation, non-linear interpolation, polynomial interpolation (e.g., quadratic interpolation), etc. The interpolation technique may depend on the voltage libraries closest to the voltage level of the integrated circuit. For example, a first interpolation technique may be used if the closest voltage libraries are 0.7 volts and 0.8 volts, and a second interpolation technique may be used if the closest voltage libraries are 0.8 volts and 0.9 volts. In some cases, the interpolation technique may depend on a spread (e.g., difference) between the closest voltage libraries to the voltage of the integrated circuit. For example, if the spread between the closest voltage libraries is relatively small, linear interpolation may be used. If the spread between the closest voltage libraries is relatively large, quadratic interpolation may be used. In some cases, interpolated libraries for various target voltages for integrated circuits may be compiled during a manufacturing or design phase of the system 80 and stored for later use by the integrated circuit.

Figure 5:
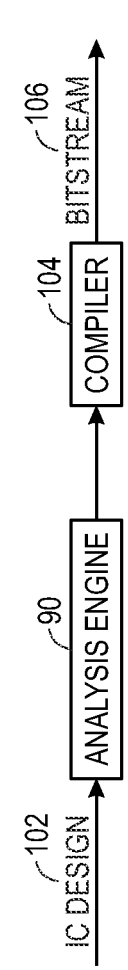
FIG. 5 is a block diagram illustrating example connections of an analysis engine of the system 80 of FIG. 4, according to an embodiment of the present disclosure.

FIG. 5 is a block diagram illustrating example connections of the analysis engine 90 of the system 80 of FIG. 4, according to an embodiment of the present disclosure. As shown, the analysis engine 90 may receive a design for the integrated circuit 102. The design 102 may include the timing and/or power model generated by the model generator 88. The design 102 may also include various desired parameters for the integrated circuit including a voltage, a frequency, a temperature, a power, etc. At least a portion of the design 102 may be provided by the designer of the integrated circuit. As discussed above, the analysis engine 90 may determine an amount of slack of the integrated circuit design 102 for operation on the integrated circuit.

The analysis engine 90 may provide results of the analysis to the scaler 86. That is, the scaler 86 may use the analysis results in determining the updated interpolated voltage for the integrated circuit. Once the slack is near zero, the analysis engine 90 may provide a current interpolated voltage (e.g., the updated interpolated voltage) to a compiler 104. The compiler 104 generate a bitstream 106 used to program the integrated circuit based on the interpolated voltage that produces the near zero slack.

Figure 6:
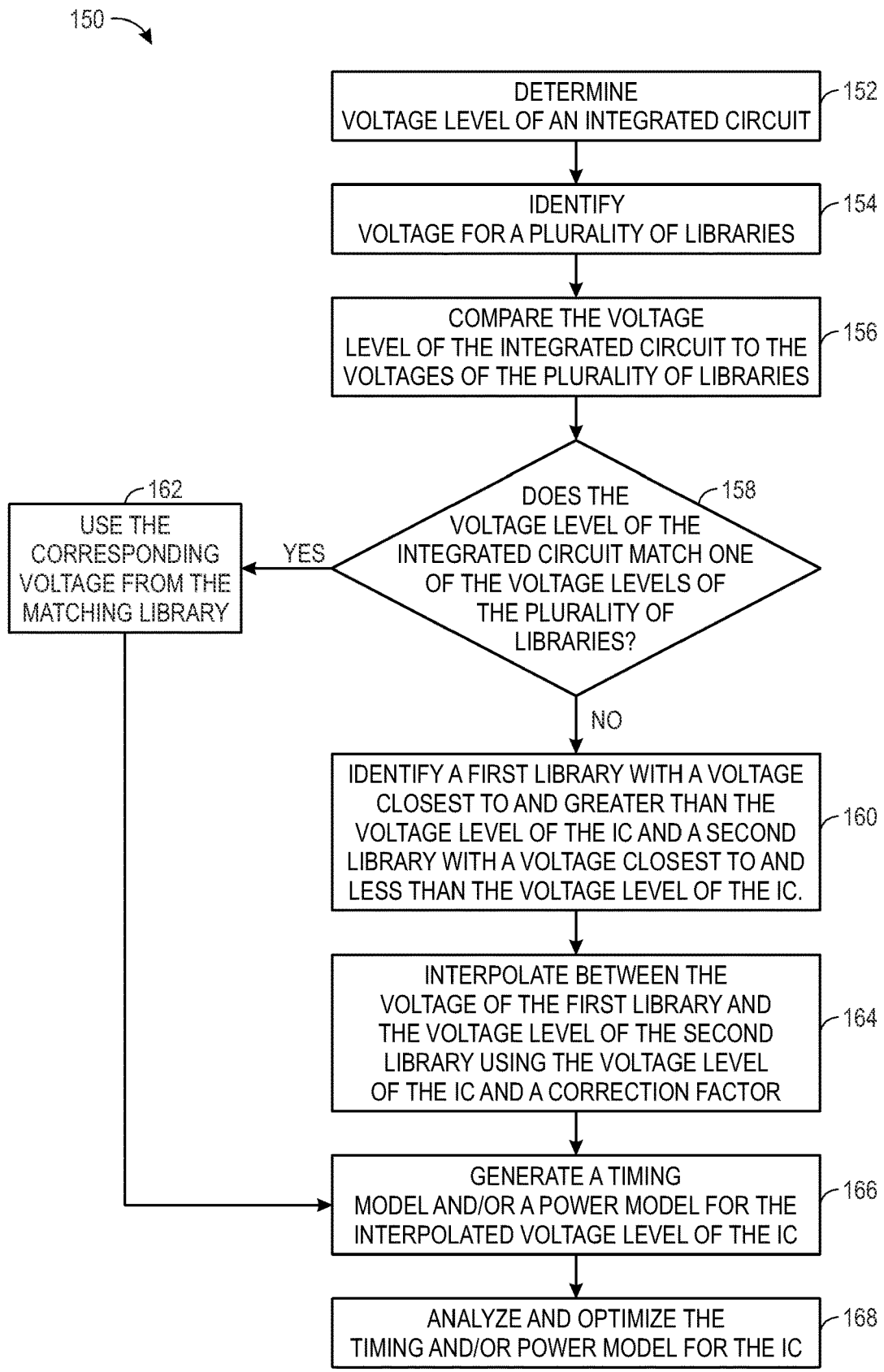
FIG. 6 is a flow chart of a process to generate a timing and/or power model for the integrated circuit (IC) of FIGS. 1-3 and program the IC using the timing and/or power model, in accordance with an embodiment of the present disclosure.

FIG. 6 is a flow chart of a process 150 to generate a timing and/or power model for the integrated circuit (IC) of FIGS. 1-3 and program the integrated circuit using the timing and/or power model, in accordance with an embodiment of the present disclosure. The operations of FIG. 6 may be executed by the systems 80 and 100 discussed with respect to FIGS. 4 and 5, respectively, and more particularly may be performed by, for example, the design software 14 of FIG. 1.

At operation 152, the system 80 may determine a voltage level (e.g., an optimal voltage) of an integrated circuit. For example, an integrated circuit (e.g., a field programmable gate array (FPGA)) to be programmed may be analyzed to determine a voltage at which the FPGA operates. This voltage may be determined at a time of manufacture of the FPGA or may be determined at a time of programming the FPGA. At operation 154, the system 80 may identify a voltage level for a number of voltage libraries. As discussed above, the voltage libraries may be predefined and stored in memory, such as a configuration memory. In some cases, the configuration memory may be associated with the programmable logic of a programmable logic device. The voltage libraries may correspond to a particular voltage level (e.g., 0.7 volts, 0.8 volts, 0.9 volts) and may define discrete power, voltage, and temperature (PVT) conditions for the associated voltage level.

At operation 156, the system 80 may compare the voltage level of the integrated circuit and the voltage levels of the voltage libraries. At operation 158, the system 80 may determine if the voltage level of the integrated circuit matches one of the voltage levels of the voltage libraries. If the voltage of the integrated circuit matches one of the voltage levels of the voltage libraries, the model generator 88 may use that voltage library to generate a timing and/or power model for the integrated circuit at operations 162 and 166. If the voltage of the integrated circuit does not match one of the voltage levels of the voltage libraries, the system 80 may identify a first voltage library 82 with a voltage level closest to and greater than the voltage level of the integrated circuit and a second voltage library 82 with a voltage level closest to and less than the voltage level of the integrated circuit, at operation 160.

At operation 164, the system 80 may interpolate between the voltage of the first library and the voltage level of the second library using the voltage level of the integrated circuit and the correction factor. As discussed above, the interpolation technique used in operation 164 may depend on the voltage libraries closest to the voltage level of the integrated circuit and/or a spread between the closest voltage libraries.

At operation 166, the system 80 may generate a timing and/or power model for the interpolated voltage level of the integrated circuit. The power model may include power, voltage, temperature (PVT) conditions for the integrated circuit according to the interpolated voltage. For example, the analysis engine 90 may determine an amount of slack for a particular workload of the integrated circuit. If the slack is positive or negative (e.g., non-zero), the analysis engine 90 may provide an indication of the amount of slack to the scaler 86 to adjust the interpolated voltage. In that case, the model generator 88 may generate an updated timing and/or power model for the integrated circuit using the updated interpolated voltage. In some cases, the model generator 88 may determine the amount of slack for the integrated circuit. The model generator 88 and/or the analysis engine 90 may optimize the timing and/or power model of the integrated circuit by performing iterations of operations 158-166 using a different interpolated voltage based on an updated voltage level of the integrated circuit and/or an updated voltage correction factor. That is, the interpolated voltage used to generate a timing and/or power model of the integrated circuit may change for each iteration of the operations 158-166 until the slack is near zero. Once the interpolated voltage results in near zero slack, the analysis engine 90 may analyze (and optimize) the integrated circuit using the timing power model which is based at least in part on the interpolated voltage and the corresponding power, voltage, temperature (PVT) conditions at operation 168.

Advantageously, embodiments discussed herein provide techniques to determine an optimal operating voltage (and corresponding conditions/parameters) for an integrated circuit (e.g., a programmable logic device such as a field programmable gate array). Further, embodiments presented herein provide techniques for generating, analyzing, and optimizing the timing and/or power model for the integrated circuit using the determined voltage to improve an efficiency and reduce an overall power consumption of the integrated circuit.

While the embodiments set forth in the present disclosure may be susceptible to various modifications and alternative forms, specific embodiments have been shown by way of example in the drawings and have been described in detail herein. However, it should be understood that the disclosure is not intended to be limited to the particular forms disclosed. The disclosure is to cover all modifications, equivalents, and alternatives falling within the spirit and scope of the disclosure as defined by the following appended claims.

The techniques presented and claimed herein are referenced and applied to material objects and concrete examples of a practical nature that demonstrably improve the present technical field and, as such, are not abstract, intangible, or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

EXAMPLE EMBODIMENTS

Example Embodiment 1

A system comprising: a programmable logic device configurable to execute a number of operations; a number of voltage libraries defining predetermined voltage levels for analysis of the programmable logic device; a scaler configured to: determine an operating voltage of the programmable logic device; receive a voltage correction factor based at least in part on the operating voltage of the programmable logic device; and determine an interpolated voltage for the programmable logic device based on the operating voltage of the programmable logic device, the voltage correction factor, and at least one of the predetermined voltage levels; and an analysis engine configured to determine an amount of slack for a particular workload of the programmable logic device at the interpolated voltage.

Example Embodiment 2

The system of example embodiment 1, wherein the scaler is configured to determine an updated voltage level for the programmable logic device based on the amount of slack at the interpolated voltage and wherein the slack is associated with a timing slack or a power slack of the programmable logic device at the interpolated voltage.

Example Embodiment 3

The system of example embodiment 1, wherein the programmable logic device comprises a field-programmable gate array (FPGA).

EXAMPLE EMBODIMENT 4. The system of example embodiment 1, wherein the number of voltage libraries comprise power, voltage, and temperature conditions for the programmable logic device.

Example Embodiment 5

The system of example embodiment 1, wherein the analysis engine comprises a timing analyzer and a power analyzer.

Example Embodiment 6

The system of example embodiment 5, wherein the timing analyzer and the power analyzer are configured to determine the amount of slack for a particular workload of the programmable logic device at the operating voltage of the programmable logic device.

Example Embodiment 7

The system of example embodiment 1, wherein the scaler is configured to determine an updated voltage level for the programmable logic device based on the amount of slack at the operating voltage of the programmable logic device.

Example Embodiment 8

The system of example embodiment 7, wherein the model generator is configured to generate a voltage library for the interpolated voltage.

Example Embodiment 9

The system of example embodiment 7, wherein the updated voltage level is determined by interpolating between two of the predetermined voltage levels for corresponding voltage libraries of the number of voltage libraries.

Example Embodiment 10

A method comprising: determining a voltage level of a programmable logic device; identifying a plurality of voltage libraries each defining a predetermined voltage level for analysis of the programmable logic device; comparing the voltage level of a programmable logic device to the predetermined voltage levels of the plurality of voltage libraries; identifying a first voltage level of the predetermined voltage levels and a second voltage level of the predetermined voltage levels, the first voltage level closest to and greater than the voltage level of the programmable logic device, the second voltage level closest to and less than the voltage level of the programmable logic device; generating an interpolated voltage level for the programmable logic device based at least in part on the first voltage level and the second voltage level; and generating a timing and power model for the programmable logic device based on the interpolated voltage level.

Example Embodiment 11

The method of example embodiment 10, comprising: analyzing the timing and power model for the programmable logic device based at least in part on the timing and power model; and determining an amount of slack for at least one of a timing and power of the programmable logic device at the interpolated voltage level.

Example Embodiment 12

The method of example embodiment 10, comprising analyzing the programmable logic device at the interpolated voltage level using the timing and power model.

Example Embodiment 13

The method of example embodiment 10, comprising obtaining a voltage correction factor, wherein the interpolated voltage level is based at least in part on the voltage correction factor.

Example Embodiment 14

The method of example embodiment 10, wherein the interpolated voltage level is determined by interpolating between the first voltage level and the second voltage level.

Example Embodiment 15

The method of example embodiment 10, comprising: determining the voltage level of a programmable logic device matches a predetermined voltage level of a first voltage library of the plurality of voltage libraries; generating a timing and power model for the programmable logic device based on the first voltage library; and analyzing the programmable logic device at the first voltage level using the timing and power model based on the first voltage library.

Example Embodiment 16

A device comprising: configuration memory configured to store a plurality of voltage libraries defining predetermined voltage levels; a programmable logic configured to perform a first operation based on at least one predetermined voltage level of the voltage libraries; and control circuitry configured to: instruct the programmable logic to perform the first operation; and while the programmable logic performs the first operation: receive a first power value; determine a slack associated with the at least one predetermined voltage level;

generate an updated voltage value for the programmable logic based at least in part on the slack; and upon determining that the slack is near zero, generating a timing and/or power model for the programmable logic at the updated voltage level.

Example Embodiment 17

The device of example embodiment 16, wherein the updated voltage level is determined by interpolating between two voltage libraries of the plurality of voltage libraries.

Example Embodiment 18

The device of example embodiment 17, wherein the slack indicates a difference between a frequency and/or power of the integrated circuit at the at least one predetermined voltage level and a target frequency and/or power of the integrated circuit.

Example Embodiment 19

The device of example embodiment 17, the control circuitry configured to analyze the programmable logic based on the timing and/or power model using the interpolated voltage.

Example Embodiment 20

The device of example embodiment 17, the control circuitry configured to generate a voltage library based at least in part on the updated voltage level.

What is claimed is:

1. A system comprising:
a programmable logic device configurable to execute a number of operations;
a number of voltage libraries defining predetermined voltage levels for analysis of the programmable logic device;
a scaler configured to:
determine an operating voltage of the programmable logic device;
receive a voltage correction factor based at least in part on the operating voltage of the programmable logic device; and
determine an interpolated voltage for the programmable logic device based on the operating voltage of the programmable logic device, the voltage correction factor, and at least one of the predetermined voltage levels; and
an analysis engine configured to determine an amount of slack for a particular workload of the programmable logic device at the interpolated voltage.

2. The system of claim 1, wherein the scaler is configured to determine an updated voltage level for the programmable logic device based on the amount of slack at the interpolated voltage and wherein the slack is associated with a timing slack or a power slack of the programmable logic device at the interpolated voltage.

3. The system of claim 1, wherein the programmable logic device comprises a field-programmable gate array (FPGA).

4. The system of claim 1, wherein the number of voltage libraries comprise power, voltage, and temperature conditions for the programmable logic device.

5. The system of claim 1, wherein the analysis engine comprises a timing analyzer and a power analyzer.

6. The system of claim 5, wherein the timing analyzer and the power analyzer are configured to determine the amount of slack for a particular workload of the programmable logic device at the operating voltage of the programmable logic device.

7. The system of claim 1, wherein the scaler is configured to determine an updated voltage level for the programmable logic device based on the amount of slack at the operating voltage of the programmable logic device.

8. The system of claim 7, wherein a model generator is configured to generate a voltage library for the interpolated voltage.

9. The system of claim 7, wherein the updated voltage level is determined by interpolating between two of the predetermined voltage levels for corresponding voltage libraries of the number of voltage libraries.

10. A method comprising:
determining a voltage level of a programmable logic device;
identifying a plurality of voltage libraries each defining a predetermined voltage level for analysis of the programmable logic device;
comparing the voltage level of a programmable logic device to the predetermined voltage levels of the plurality of voltage libraries;
identifying a first voltage level of the predetermined voltage levels and a second voltage level of the predetermined voltage levels, the first voltage level closest to and greater than the voltage level of the programmable logic device, the second voltage level closest to and less than the voltage level of the programmable logic device;
generating an interpolated voltage level for the programmable logic device based at least in part on the first voltage level and the second voltage level; and
generating a timing and power model for the programmable logic device based on the interpolated voltage level.

11. The method of claim 10, comprising:
analyzing the timing and power model for the programmable logic device based at least in part on the timing and power model; and
determining an amount of slack for at least one of a timing and power of the programmable logic device at the interpolated voltage level.

12. The method of claim 10, comprising analyzing the programmable logic device at the interpolated voltage level using the timing and power model.

13. The method of claim 10, comprising obtaining a voltage correction factor, wherein the interpolated voltage level is based at least in part on the voltage correction factor.

14. The method of claim 10, wherein the interpolated voltage level is determined by interpolating between the first voltage level and the second voltage level.

15. The method of claim 10, comprising:
determining the voltage level of a programmable logic device matches a predetermined voltage level of a first voltage library of the plurality of voltage libraries;
generating a timing and power model for the programmable logic device based on the first voltage library; and
analyzing the programmable logic device at the first voltage level using the timing and power model based on the first voltage library.

16. A device comprising:
configuration memory configured to store a plurality of voltage libraries defining predetermined voltage levels;

a programmable logic configured to perform a first operation based on at least one predetermined voltage level of the voltage libraries; and control circuitry configured to:
  instruct the programmable logic to perform the first operation; and
  while the programmable logic performs the first operation:
    receive a first voltage value;
    receive a voltage correction factor based at least in part on the first voltage value;
    determine a slack associated with the at least one predetermined voltage level;
    generate an updated voltage value for the programmable logic based at least in part on the slack and the voltage correction factor; and
    upon determining that the slack is near zero, generating a timing and/or power model for the programmable logic at the updated voltage value.

17. The device of claim 16, wherein the updated voltage value is determined by interpolating between two voltage libraries of the plurality of voltage libraries to generate an interpolated voltage.

18. The device of claim 17, wherein the slack indicates a difference between a frequency and/or power of the device at the at least one predetermined voltage level and a target frequency and/or power of the device.

19. The device of claim 17, the control circuitry configured to analyze the programmable logic based on the timing and/or power model using the interpolated voltage.

20. The device of claim 17, the control circuitry configured to generate a voltage library based at least in part on the updated voltage value.

* * * * *